No. 853,150. PATENTED MAY 7, 1907.
F. E. BARTZ.
NUT LOCK.
APPLICATION FILED FEB. 23, 1907.

WITNESSES:
A. H. Rabsag,
R. J. Trigg

INVENTOR
Frank E. Bartz,
BY H. C. Everett Co.
Attorneys

UNITED STATES PATENT OFFICE.

FRANK E. BARTZ, OF JACKSON CENTER, PENNSYLVANIA.

NUT-LOCK.

No. 853,150.  Specification of Letters Patent.  Patented May 7, 1907.

Application filed February 23, 1907. Serial No. 358,889.

*To all whom it may concern:*

Be it known that I, FRANK E. BARTZ, a citizen of the United States of America, residing at Jackson Center, in the county of Mercer and State of Pennsylvania, have invented certain new and useful Improvements in Nut-Locks, of which the following is a specification, reference being had therein to the accompanying drawing.

This invention relates to nut locks, and its object is to provide a simple, inexpensive and effective device of this character so constructed as to prevent the loosening of the nuts on a bolt.

The invention comprises a bolt formed with a right hand thread, and a left hand thread, in combination with two co-operating nuts of novel construction, and a yielding washer interposed between the nuts.

The construction of the improvement will be fully described hereinafter in connection with the accompanying drawing which forms a part of this specification, and its novel features will be defined in the appended claims.

Figure 5:
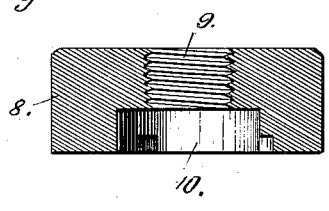
Figure 6:
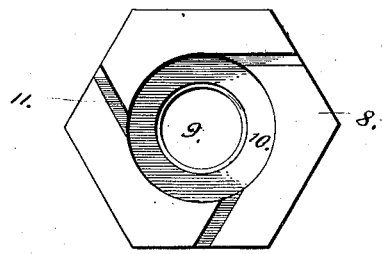
Figure 7:
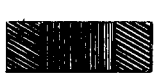
Figure 3:
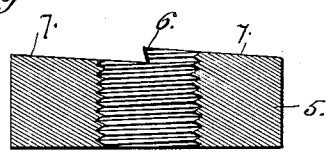
Figure 4:
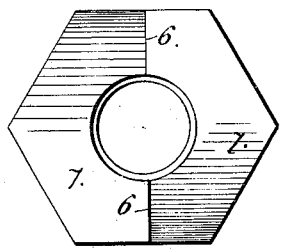
Figure 8:
Figure 2:
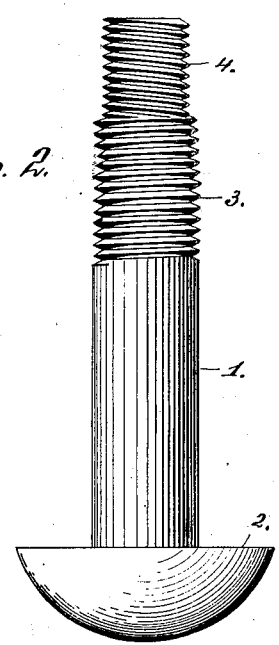
Figure 1:
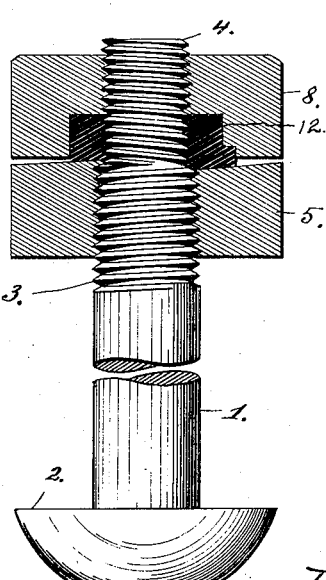

In the drawing, Figure 1 is a view partly in elevation and partly in section of a bolt and nut lock embodying the invention, Fig. 2 is an elevation of the bolt with the nuts and washer removed, Fig. 3 is a transverse section of one of the nuts employed, Fig. 4 is an elevation of the outer face of the nut shown in Fig. 3, Fig. 5 is a sectional view of the outer nut, Fig. 6 is an elevation of the inner face of the outer nut, Fig. 7 is a section of the rubber washer, and Fig. 8 is an elevation of the same.

The reference numeral 1 designates a bolt having a head 2, and formed with a right hand thread 3. The end 4 of the bolt is circumferentially reduced and formed with left hand screw-threads.

The reference numeral 5 designates a nut having its bore formed with threads corresponding to the threads 3 of the bolt. The nut 5 is recessed on its outer face, which recess is formed by cutting away the nut from one side to a point approximately to the center of the nut, the outer face 7 of the nut 5 both in the recessed portion thereof and the projecting part or portion of the outer face of this nut being inclined, the recessing of the nut on its outer face producing shoulders 6—6 both in said nut.

In connection with the nut 5, I employ an outer nut 8 the bore of which is formed with left hand threads 9 corresponding to the threads on the end 4 of the bolt. The inner face of the nut 8 is countersunk around the inner end of the threaded bore, to provide a circular seat 10, and said inner face of the nut is also formed with a plurality of tangential slots 11 extending from the countersunk seat 10 to the outer edges of the nut.

The rubber washer 12 is interposed between the two nuts 5 and 8 and said washer fits within the seat 10 of the outer nut said seat being however of less width than the thickness of the washer so that the latter projects beyond the inner face of the nut 8 against the shoulders 6 of the nut 5. When the outer nut 8 is screwed tightly upon the threaded end 4 of the bolt, the rubber washer is forced into the inner ends of the slots 11 of the outer nut thus firmly locking both of the nuts against movement.

It will be apparent from the illustration in Fig. 1 of the drawing, in connection with the foregoing description, that the washer securely holds both nuts, and that any tendency of either nut to turn is overcome by the engagement therewith of the yielding washer.

What I claim and desire to secure by Letters Patent, is:—

1. The combination with a bolt, of an inner and an outer nut thereon, the inner nut provided on its outer face with an inclined surface and being recessed to form shoulders at opposite sides of the bore of the nut, the outer nut provided on its inner face with an annular recess surrounding the bore of the nut and with slots extending tangentially to the axis of said nut, and a rubber washer seated in the annular recess of said outer nut and extending beyond the inner face of said outer nut and adapted to be compressed into the recessed portion of the inner nut and the slots of said outer nut.

2. The combination with a bolt formed with a right hand thread and a left hand thread, of an inner nut engaging the right hand thread of said bolt being recessed on its outer face, and having an inclined surface on said outer face, an outer nut mounted on the left hand thread of said bolt and provided on its inner face with an annular recess surrounding the bore of the nut and also provided on said inner face with slots, and a rubber washer seated in said annular recess and extending beyond the inner face of said outer nut and adapted to be compressed into the recessed outer face of the inner nut and the slots on the inner face of the outer nut.

3. The combination with a bolt formed with a right hand thread and a left hand thread, of an inner nut formed with a right hand thread, and recessed on its outer face to provide an inclined surface and shoulders on opposite sides of the bore of the nut, an outer nut formed with a left hand thread, and recessed on its inner face to provide a washer seat, and having slots extending tangentially to the bore of the nut, and a yielding washer interposed between said nuts and engaging in said slots against the shoulders of the inner nut.

In testimony whereof I affix my signature in the presence of two witnesses.

FRANK E. BARTZ.

Witnesses:
 H. C. EVERT,
 F. O. McCLEARY.